United States Patent
Yang et al.

(10) Patent No.: US 9,882,594 B2
(45) Date of Patent: Jan. 30, 2018

(54) APPARATUS AND METHODS FOR CONTROLLED SWITCHING OF ELECTRONIC ACCESS CLIENTS WITHOUT REQUIRING NETWORK ACCESS

(71) Applicant: Apple Inc., Cupertino, CA (US)

(72) Inventors: Xiangying Yang, Cupertino, CA (US); Jerrold Von Hauck, Windermere, FL (US)

(73) Assignee: Apple Inc., Cupertino, CA (US)

( * ) Notice: Subject to any disclaimer, the term of this patent is extended or adjusted under 35 U.S.C. 154(b) by 200 days.

(21) Appl. No.: 14/685,547

(22) Filed: Apr. 13, 2015

(65) Prior Publication Data

US 2015/0222635 A1    Aug. 6, 2015

Related U.S. Application Data

(63) Continuation-in-part of application No. 14/033,227, filed on Sep. 20, 2013, now Pat. No. 9,507,329.

(Continued)

(51) Int. Cl.
| | |
|---|---|
| *H04B 1/38* | (2015.01) |
| *H04B 1/3816* | (2015.01) |
| *H04W 12/12* | (2009.01) |
| *H04W 4/00* | (2009.01) |
| *G05B 11/01* | (2006.01) |
| *H04L 29/06* | (2006.01) |

(52) U.S. Cl.
CPC .......... *H04B 1/3816* (2013.01); *H04W 4/001* (2013.01); *H04W 12/12* (2013.01); *G05B 11/01* (2013.01); *H04B 1/38* (2013.01); *H04L 63/107* (2013.01); *H04L 63/108* (2013.01)

(58) Field of Classification Search
CPC ....... H04B 1/3816; H04B 1/38; H04W 4/001; H04W 12/12; H04L 67/34; H04L 63/107; H04L 63/108
USPC ............................ 455/458, 410, 411; 700/14
See application file for complete search history.

(56) References Cited

U.S. PATENT DOCUMENTS

| | | | |
|---|---|---|---|
| 8,131,283 | B1 | 3/2012 | Vargantwar et al. |
| 8,429,409 | B1 | 4/2013 | Wall et al. |

(Continued)

FOREIGN PATENT DOCUMENTS

| | | |
|---|---|---|
| CN | 102595404 A | 7/2012 |
| EP | 2461613 A1 | 6/2012 |

(Continued)

OTHER PUBLICATIONS

Taiwanese Patent Application No. 104117541—Office Action dated Jun. 27, 2016.

(Continued)

*Primary Examiner* — Mong-Thuy Tran
(74) *Attorney, Agent, or Firm* — Downey Brand LLP

(57) ABSTRACT

Methods and apparatuses for providing controlled switching of electronic access control clients without requiring network access are set forth herein. In one embodiment, a method for swapping of subscriptions and/or profiles for electronic Subscriber Identity Modules (eSIMs) without network supervision that prevents possibly malicious high frequency switching is disclosed. The disclosed embodiments offer reasonable management capabilities for network operators, without compromising the flexibility of eSIM operation.

20 Claims, 9 Drawing Sheets

Related U.S. Application Data

(60) Provisional application No. 61/704,405, filed on Sep. 21, 2012.

(56) References Cited

U.S. PATENT DOCUMENTS

| | | | |
|---|---|---|---|
| 8,639,245 | B2 | 1/2014 | Shi et al. |
| 8,924,715 | B2 | 12/2014 | Schell et al. |
| 9,507,329 | B2 | 11/2016 | Hauck |
| 2002/0154632 | A1 | 10/2002 | Wang et al. |
| 2009/0199264 | A1 | 8/2009 | Lang |
| 2010/0029273 | A1 | 2/2010 | Bennett |
| 2010/0279737 | A1 | 11/2010 | Joppek et al. |
| 2010/0311402 | A1 | 12/2010 | Srinivasan et al. |
| 2010/0311404 | A1 | 12/2010 | Shi et al. |
| 2011/0151832 | A1 | 6/2011 | Lai |
| 2011/0246766 | A1 | 10/2011 | Orsini et al. |
| 2012/0108206 | A1 | 5/2012 | Haggerty |
| 2012/0108207 | A1 | 5/2012 | Schell et al. |
| 2012/0108295 | A1 | 5/2012 | Schell et al. |
| 2012/0190354 | A1* | 7/2012 | Merrien ............ H04W 4/001 455/422.1 |
| 2012/0289193 | A1 | 11/2012 | Bergenwall |
| 2012/0315875 | A1 | 12/2012 | Breuer et al. |
| 2012/0331292 | A1 | 12/2012 | Haggerty et al. |
| 2013/0122864 | A1 | 5/2013 | Haggerty et al. |
| 2013/0157673 | A1 | 6/2013 | Brusilovsky |
| 2013/0183935 | A1 | 7/2013 | Holostov et al. |
| 2013/0231087 | A1 | 9/2013 | O'Leary |
| 2013/0340059 | A1 | 12/2013 | Christopher et al. |
| 2014/0080485 | A1* | 3/2014 | Park ................ H04W 36/14 455/436 |
| 2014/0122897 | A1* | 5/2014 | Dodeja ............ G06F 21/00 713/189 |
| 2015/0289137 | A1 | 10/2015 | Yang et al. |
| 2015/0310444 | A1* | 10/2015 | Chen ............ G06Q 20/4016 705/44 |

FOREIGN PATENT DOCUMENTS

| | | |
|---|---|---|
| WO | 2011142786 A1 | 11/2011 |
| WO | 2012071556 A2 | 5/2012 |
| WO | 2013008048 A1 | 1/2013 |

OTHER PUBLICATIONS

Japanese Patent Application No. 2015-533231—Office Action dated Sep. 6, 2016.
Carl Eklund, et al. "IEEE Standard 802.16: A Technical Overview of the WirelessMAN™ Air Interface for Broadband Wireless Access", IEEE Communications Magazine, Jun. 2002, pp. 98-107.
PCT Application No. PCT/US2013/061011—International Search Report and Written Opinion dated Dec. 9, 2013.
Chinese Patent Application No. 201380048945.4—First Office Action dated Aug. 17, 2017.

* cited by examiner

APPARATUS AND METHODS FOR CONTROLLED SWITCHING OF ELECTRONIC ACCESS CLIENTS WITHOUT REQUIRING NETWORK ACCESS

RELATED APPLICATIONS

This application is a continuation-in-part of U.S. application Ser. No. 14/033,227, filed Sep. 20, 2013, entitled "APPARATUS AND METHODS FOR CONTROLLED SWITCHING OF ELECTRONIC ACCESS CLIENTS WITHOUT REQUIRING NETWORK ACCESS," now U.S. Pat. No. 9,507,329 issued Nov. 29, 2016, which claims the benefit of U.S. Provisional Application No. 61/704,405, entitled "APPARATUS AND METHODS FOR CONTROLLED SWITCHING OF ELECTRONIC ACCESS CLIENTS WITHOUT NETWORK ACCESS," filed Sep. 21, 2012, the contents of which are incorporated herein by reference in their entirety for all purposes.

BACKGROUND

Technical Field

The present disclosure relates generally to the field of communications systems, and more particularly in one exemplary embodiment to switching between access control clients in a controlled manner.

Description of Related Technology

Access control is required for secure communication in most prior art wireless radio communication systems. As an example, one simple access control scheme might include: (i) verifying the identity of a communicating party, and (ii) granting a level of access commensurate with the verified identity. Within the context of an exemplary cellular system (e.g., Universal Mobile Telecommunications System (UMTS)), access control is governed by an access control client, referred to as a Universal Subscriber Identity Module (USIM) executing on a physical Universal Integrated Circuit Card (UICC). The USIM access control client authenticates the subscriber to the UMTS cellular network. After successful authentication, the subscriber is allowed access to the cellular network. As used hereinafter, the term "access control client" refers generally to a logical entity, either embodied within hardware or software, suited for controlling access of a first device to a network. Common examples of access control clients include the aforementioned USIM, CDMA Subscriber Identification Modules (CSIM), Internet Protocol (IP) Multimedia Services Identity Module (ISIM), Subscriber Identity Modules (SIMs), Removable User Identity Modules (RUIM), etc.

Incipient research is directed to virtualization of access control clients. For example, an electronic Subscriber Identity Module (eSIM) is a virtualized access control client that is executed from a secure element within the client device. Virtualized access control clients can provide significant benefits for users and network operators. For example, a user can transfer an eSIM freely between devices; moreover, eSIMs can be flexibly stored, backed up, etc. Network operators can distribute and/or patch eSIMs via software distribution networks. However, due to the sensitive nature of the data used for network access (e.g., cryptographic information) and user information (e.g., account information), the secure element and eSIM must be tightly controlled to prevent e.g., theft, misuse, malicious behavior, etc.

Unfortunately, for reasons described in greater detail herein, network operators have been reluctant to adopt eSIMs due to various perceived security concerns. For example, network operators have expressed some degree of apprehension that unsupervised switching of eSIMs could be misused. To these ends, network operators have required that eSIMs can only be transacted with network supervision. While supervised solutions may alleviate security concerns, such tight control effectively negates many of the advantages offered by eSIM technologies.

Accordingly, improved methods and apparatuses for eSIM switching are needed. More generally, such solutions should ideally offer reasonable management capabilities for network operators, without compromising the flexibility of virtualized access control clients.

SUMMARY

The present disclosure addresses the foregoing needs by providing, inter alia, apparatuses and methods for controlled switching of electronic access control clients without requiring network access.

Components within a mobile device—such as a secure element (also referred to herein as an electronic Universal Integrated Circuit Card (eUICC)) and/or a security module with which the secure element interfaces—can be configured to access an internal time component that can be used to identify an amount of time that has elapsed to help prevent high-frequency eSIM management operations (e.g., eSIM swaps) from occurring. In some cases, however, this internal time component can be compromised (e.g., by malicious software), and can potentially enable high-frequency swapping to occur without being identified.

Accordingly, some embodiments involve including within the mobile device one or more sensors (e.g., temperature, voltage, etc.) configured to monitor the operating conditions of various modules included in the mobile device, e.g., the secure element, the security module with which the secure element is configured to interface, different clocks, and the like. According to some embodiments, the sensors can be calibrated in accordance with regular/expected operating parameters of the modules included in the mobile device, thereby enabling the identification of conditions where current operating parameters of the modules included in the mobile device are suspicious in nature (e.g., out of bound operating frequencies, temperatures, etc.).

Notably, and according to some embodiments, the security module is independent to the secure element and functions to promote a secure execution environment across the various components included in the mobile device. For example, secure element can be configured to interface with the security module prior to carrying out eSIM management operations (e.g., installing, uninstalling, activating, deactivating, swapping, etc.), where the security module has the authority to approve or deny the eSIM management operations.

One embodiment sets forth a method for providing controlled switching of access control clients within a mobile device without requiring access to a network. Specifically, the method is implemented by a security module included in the mobile device, and includes the steps of (1) receiving, from a secure element included in the mobile device, a request to swap a first access control client with a second access control client, wherein the first access control client is active and the second access control client is inactive, (2) determining whether at least one module included in the mobile device is operating within pre-defined thresholds, and (3) when the at least one module is operating within the pre-defined thresholds: determining, based on an internal time component that corresponds to the at least one module, whether the request is valid, and when the request is valid: causing the secure element to deactivate the first access control client, and causing the secure element to activate the second access control client.

Another embodiment sets forth a method for providing controlled switching of access control clients within a mobile device without requiring access to a network. Specifically, the method is implemented by a secure element included in the mobile device, and includes the steps of (1) receiving a request to swap a first access control client with a second access control client, wherein the first access control client is active and the second access control client is inactive, (2) determining whether the secure element is operating within pre-defined thresholds, and (3) when the secure element is operating within the pre-defined thresholds: determining, based on an internal time component that corresponds to the secure element, whether the request is valid, and when the request is valid: deactivating the first access control client, and activating the second access control client.

Another embodiment sets forth a mobile device configured to switch electronic access control clients without network access. Yet another embodiment sets forth a non-transitory computer-readable medium with at least one computer program stored thereon, the at least one computer program configured to, when executed by a processor included in a mobile device, cause the mobile device to switch electronic access control clients without network access.

Further features of the various principles described herein, their nature and various advantages will be more apparent from the accompanying drawings and the following detailed description.

DETAILED DESCRIPTION

Detailed Description of Exemplary Embodiments

Figure 1:
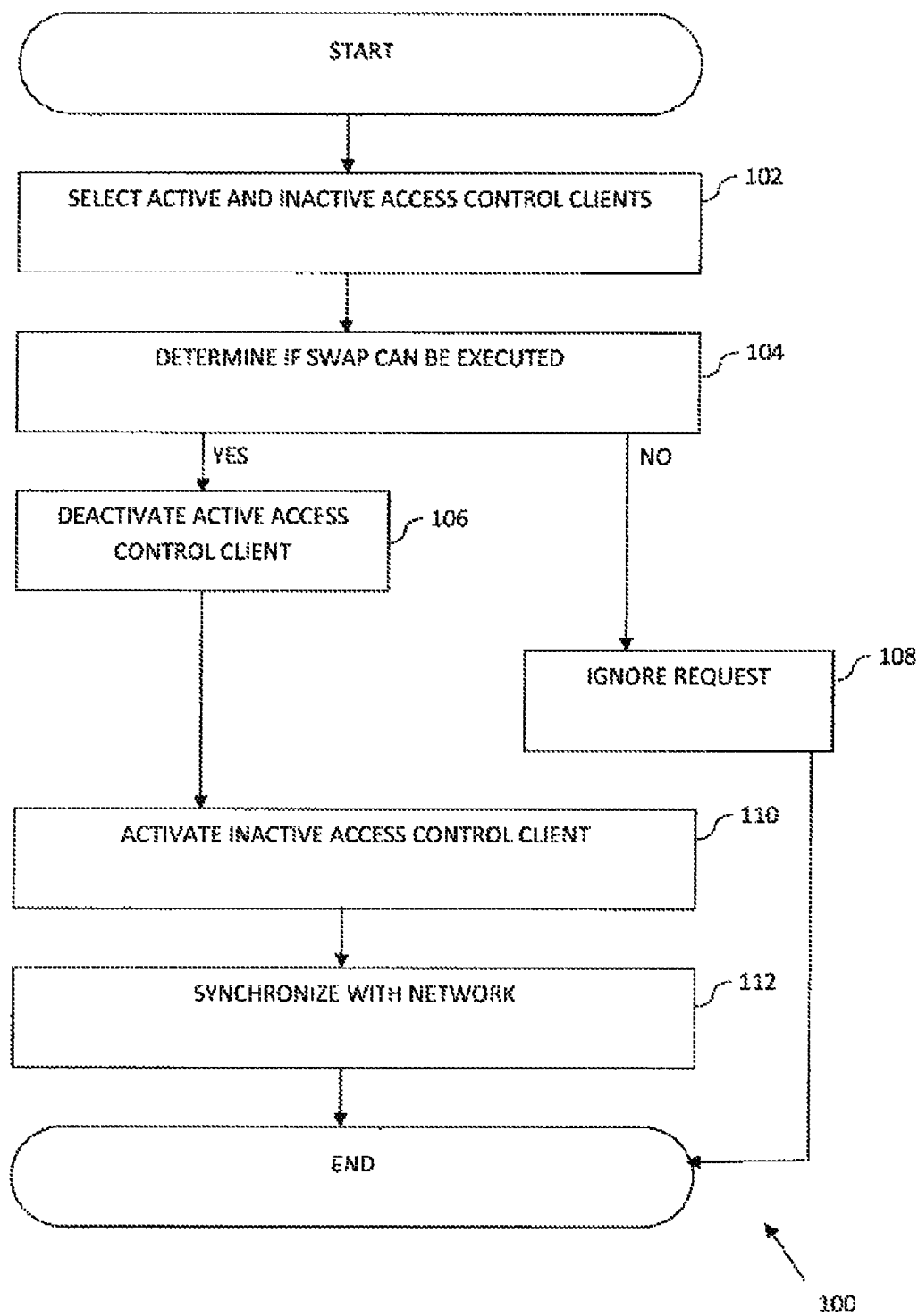
FIG. 1 is a logical flow diagram of one embodiment of a method for controlled switching of electronic access control clients without requiring network access.

Exemplary embodiments are now described in detail. While these embodiments are primarily discussed in the context of electronic Subscriber Identity Modules (eSIMs) of a GSM, GPRS/EDGE, UMTS, or Long Term Evolution (LTE) cellular network, it will be recognized by those of ordinary skill that the present disclosure is not so limited. In fact, the various principles discussed herein are useful in any network (whether wireless cellular or otherwise) that can benefit from controlled switching of electronic access control clients without requiring network access.

It will also be recognized that while the term "subscriber identity module" is used herein (e.g., eSIM), this term in no way necessarily connotes or requires either (i) use by a subscriber per se (i.e., the disclosed embodiments may be practiced by a subscriber or non-subscriber); (ii) identity of a single individual (i.e., the disclosed embodiments may be practiced on behalf of a group of individuals such as a family, or intangible or fictitious entity such as an enterprise); or (iii) any tangible "module" equipment or hardware.

Subscriber Identity Module (SIM) Operation

Within the context of the exemplary prior art UMTS cellular network, user equipment (UE) includes a mobile device and a Universal Subscriber Identity Module (USIM). The USIM is a logical software entity that is stored and executed from a physical Universal Integrated Circuit Card (UICC). A variety of information is stored in the USIM such as subscriber information, as well as the keys and algorithms used for authentication with the network operator in order to obtain wireless network services. In one embodiment, USIM software is based on the Java Card™ programming language. Java Card is a subset of the Java™ programming language that has been modified for embedded "card" type devices (such as the aforementioned UICC). Other implementations may include so-called "native" software implementations, and/or implementations that are proprietary, etc.

Generally, UICCs are programmed with a USIM prior to subscriber distribution, where the pre-programming or "personalization" is specific to each network operator. For example, before deployment, the USIM is associated with an International Mobile Subscriber Identity (IMSI), a unique Integrated Circuit Card Identifier (ICC-ID) and a specific authentication key (K). The network operator stores the association in a registry contained within the network's Authentication Center (AuC). After personalization the UICC can be distributed to subscribers.

As a brief aside, during normal authentication procedures, the UE acquires the IMSI from the USIM. The UE passes the IMSI to the Serving Network (SN) of the network operator or the visited core network. The SN forwards the authentication request to the AuC of the Home Network (HN). The HN compares the received IMSI with the AuC's registry and obtains the appropriate key K. The HN generates a random number (RAND) and signs it with key K using an algorithm to create the expected response (XRES). The HN further generates a Cipher Key (CK) and an Integrity Key (IK) for use in cipher and integrity protection as well as an Authentication Token (AUTN) using various algorithms. The HN sends an authentication vector, consisting of the RAND, XRES, CK, and AUTN to the SN. The SN stores the authentication vector only for use in a one-time authentication process. The SN passes the RAND and AUTN to the UE.

Once the UE receives the RAND and AUTN, the USIM verifies if the received AUTN is valid. If so, the UE uses the received RAND to compute its own response (RES) using the stored key K and the same algorithm that generated the XRES. The UE passes the RES back to the SN. The SN compares the XRES to the received RES, and, if they match, the SN authorizes the UE to use the operator's wireless network services.

Typically, the Authentication and Key Agreement (AKA) procedure is performed by a secure processor that has been packaged within a SIM card. Prior art SIM cards have at least two (2) distinct and desirable properties: (i) SIM cards provide cryptographically secured storage for SIM data (e.g., account information, encryption keys, etc.), and (ii) SIM cards cannot be easily cloned.

A prior art SIM card includes a processor and a memory formed in a Universal Integrated Circuit Card (UICC). The SIM card may be filled with epoxy resin to prevent external probing of data signals on the UICC. Other tamper-proof structures may be included in the UICC if desired (e.g., shielding layers, masking layers, etc.). The SIM card has a secure interface to the processor, and the processor has an internal interface to the memory. The UICC receives power from the external device, which enables the processor to execute code stored in the memory. The memory itself is not directly accessible (i.e., internal filesystems are hidden from the user), and must be accessed via the processor.

During normal operation, the processor accepts a limited number of commands. Each of the commands is only conditionally accessible. Access conditions are constrained to the execution of commands to prevent unauthorized access. Access conditions may or may not be hierarchical, e.g., authorization for one level may not automatically grant authorization for another level. For example, one set of access conditions may include: (i) always accessible, (ii) never accessible, (iii) accessible to a first account, (iv) accessible to a second account, etc. Conditional access is granted only after successful completion of an appropriate security protocol. Common methods for verifying identity may include a password or Personal Identification Number (PIN), challenge of a shared secret, etc.

Conditional access, limited command set, and protected memory space ensure that the information stored within the SIM card is secure from external access. Cloning a SIM card would entail construction of a physical card as well as construction of the internal filesystem and data. Thus, the combination of these features renders the physical SIM card impervious to practical forgery attempts.

Electronic Subscriber Identity Module (eSIM) Operation

While traditional SIM solutions are embodied within a removable Integrated Circuit Card (ICC) (also referred to as a "SIM card"), incipient research by the Assignee hereof is directed to virtualizing SIM operation within a software client executing within the mobile device. Virtualized SIM operation can reduce device size, increase device functionality, and provide greater flexibility.

Unfortunately, virtualized SIM operation also presents multiple new challenges for network operators and device manufacturers. For example, traditional SIM cards are manufactured and guaranteed by a trusted SIM vendor. These traditional SIM cards execute a single secure version of software that has been permanently "burned" to the SIM card. Once burned, the card cannot be tampered with (without also destroying the SIM card).

In contrast, mobile devices are manufactured by a wide range of device manufacturers, and may execute software provided by multiple or even unknown third party software vendors. Additionally, mobile devices are frequently "patched" with software, which can both fix existing bugs, and introduce new ones. Any software is susceptible to corruption, sabotage, and/or misuse. Moreover, while physical SIM cards are very difficult to replicate, software can be readily copied, multiplied, etc. Since each SIM represents a contracted amount of access to finite network resources, illicit use of a virtualized SIM can greatly impact network operation and user experience.

As a brief aside, the terms "conservation," "conserve," and "conserved," as used herein refer to an element (either physical or virtual) that cannot be trivially multiplied or diminished. For example, a conserved eSIM cannot be copied or replicated during normal operation.

Additionally, as used herein, the term "uniqueness" as applied to an element (either physical or virtual), refers to the property whereby the element is the one and only element having a particular property and/or characteristic. For instance, a unique eSIM cannot have a duplicate eSIM.

As used herein, the term "security" generally refers to protection of the data and/or software. For example, access control data security ensures that the data and/or software associated with an access control client is protected from theft, misuse, corruption, publication and/or tampering, by unauthorized activities, and/or malicious third parties.

Moreover, as used herein, the term "user authorization" generally refers to specifying a user's access to resources. As a brief aside, with prior art physical SIM cards, user authorization is enforced with physical SIM card possession, where the physical card represents the user's authorization to access network resources. For example, when a physical SIM card is moved from a first phone to a second phone, it is assumed that the move was performed by the user (and implicitly authorized by the user). Within the context of eSIM operation, analogous capabilities are needed for user authorization of eSIM transfers. In particular, the "owner" of the eSIM (and also the network) needs assurances that the eSIM is only transferred to legitimate devices.

Generally, it is appreciated that software is more flexible than hardware; for example, software is easy to copy, modify, and distribute. Additionally, software can often be made cheaper, more power efficient, and physically smaller than hardware equivalents. Accordingly, while conventional SIM operation makes use of physical form factors such as cards (UICCs), current areas of research are focused toward virtualizing SIM operation within software. However, the sensitive nature of SIM data (e.g., subscriber specific information, etc.) requires special consideration. For example, various portions of SIM data are unique to subscribers, and should be carefully guarded from malicious third parties. Moreover, as previously stated, each SIM represents a contracted amount of access to finite network resources; thus, duplication, destruction, and/or reclamation of SIMs must be managed to prevent over and/or underutilization of network resources, as well as subrogation of service provider fees or revenue. Accordingly, virtualized SIMs should satisfy the following properties: (i) security, (ii) uniqueness, and (iii) conservation. Moreover, such properties should ideally be afforded at a cost that is commensurate with existing network infrastructure costs.

Method

Various embodiments of methods for controlled switching of electronic access control clients without requiring network access are described in greater detail herein. Specifically, the various exemplary methods detailed in greater detail herein allow swapping of subscriptions and/or profiles for access control clients without network supervision, while preventing high frequency switching. High frequency switching of access control clients may possibly be used in, e.g., denial of service type attacks and/or general disruption of device/network operation.

Referring now to FIG. 1, one embodiment of a method for controlled switching of electronic access control clients without requiring network access is presented. Consider a device that includes at least a secure element (also referred to herein as an electronic Universal Integrated Circuit Card (eUICC)) configured to select, activate, and execute at least one access control client, where the secure element is further configured to swap between a plurality of inactive access control clients. For example, a mobile device may have multiple electronic Subscriber Identity Modules (eSIMs) that are stored within an electronic Universal Integrated Circuit Card (eUICC).

At step 102, an inactive access control client and an active access control client are selected for a switching operation. For clarity, as used herein, the terms "active" and "inactive" refer to the execution status of the access control client, not the current connection status (i.e., an active access control client may or may not have a connection context to the network). It is appreciated by those of ordinary skill in the related arts that an access control client that is being executed by the secure element is "active," whereas an access control client that is not executed is "inactive."

In one embodiment, the selection is performed by a user. User selection may occur via a user interface. In other variants, user selection may occur via a physical operation, such as card insertion. In still other variants, user selection may occur based on a physical switch, et In other embodiments, selection can be initiated by a software entity. Common examples of software entities include for example: the operating system (OS), the secure element OS, software applications, third party software applications, network applications, etc. In some embodiments, software embodiments may automatically implement swapping based on e.g., geographic location, time of day, usage, etc. For instance, the OS may automatically swap a first eSIM associated with a business account with a second eSIM associated with a personal account at designated times of the day. In other embodiments, the OS may automatically swap a first eSIM with a second eSIM to prevent and/or reduce roaming charges, etc.

Moreover, those of ordinary skill in the related arts will recognize that the following examples are purely illustrative. For example, in other schemes, the swapping may be performed with a different number of access control clients. In one such scheme the secure element may attempt to swap two (2) eSIMs into operation in place of one (1) previously active eSIM; i.e., the number of eSIMs being "swapped" does not need to be a one-for-one relationship.

Furthermore, while the following examples are presented in the context that no network access is available, the various principles of the present disclosure are equally applicable to scenarios where the switch can be executed without using existing network access. For example, in some circumstances, network connectivity may be undesirable based on e.g., power consumption, network congestion, etc. Moreover, the switch may be executed at the behest of a network entity or process.

Still further it is appreciated that in various disclosed embodiments, the selection of either the active or inactive access control client may be implicit. For example, in some implementations, a user may deactivate an active access control client, which results in the active access control client being replaced with a previously inactive default access control client. In a similar example, where a user has selected to activate one access control client that overlaps the capabilities of a currently active access control client, the currently active access control client may be replaced (rather than keeping both access control clients active).

At step 104 of the method 100, the secure element determines if a swap can be executed. Specifically, the secure element evaluates and prevents excessive and/or high frequency switching.

In one exemplary embodiment, the secure element applies one or more criteria to make the aforementioned determination; e.g., the secure element limits the total number of transactions that can be performed without supervision. In this manner, regardless of how fast the switching occurs, the secure element cannot perform too many swapping operations. For example, in one variant, the secure element and network operate on a "credit" system, where the secure element can perform functions without network supervision for a credited number of transactions. At a later point, the secure element can connect to the network and synchronize its transactions with the network (and receive new credits). In this manner, the user can be granted a reasonable amount of autonomy, while limiting the degree to which such flexibility can be exploited.

In some variants, the credit system may be limited to a subset of operations. For example, a user may be allowed to freely deselect an operational profile or eSIM, but have only a limited number of credits for selecting operational profiles.

In some embodiments, the credit system may be further monitored by a supervisory network element. According to one embodiment, the supervisory network element represents any hardware device (e.g., a server device) or a service (e.g., a software component) that is configured to monitor transactions that take place within the credit system. For example, where a secure element appears to be requesting top-off credits too frequently (indicating an unusually high amount of swapping behavior), the network entity may flag the secure element/mobile device as possibly malicious or compromised. In other examples, the network entity may throttle (increase or reduce) the refreshing of credits to control the amount of swapping behavior (e.g., increasing credits may reduce network overhead for swapping operations, reducing credits increases the networks supervisory responsibilities).

In other embodiments, the secure element can be configured to directly/indirectly limit the rate of swapping. For example, the secure element may be able to determine, e.g., based on an internal time component and log information, the amount of time that has elapsed after the last swap occurred. A swap request that occurs too soon after a prior swap may be rejected. In a similar embodiment, the secure element may require that an access control client is active for at least a minimum time interval before swapping. Various other schemes for time based rate limiting will be recognized by those of ordinary skill in the related arts, given the contents of the present disclosure.

As noted above, the secure element can be configured to access an internal time component that can be used to identify an amount of time that has elapsed to help prevent high-frequency swapping from occurring. In some cases, however, this internal time component can be compromised (e.g., by malicious software), and can potentially enable high-frequency swapping to occur without being identified by the secure element. For example, when the internal time component is a software-based clock (e.g., managed by a primary OS executing on the UE), the internal time component can be modified by rolling the current time forward (e.g., via a software-based command) after each swap is carried out or attempted. More specifically, and according to this example, the internal time component could be corrupted to create an illusion that a sufficient amount of time has lapsed after the last swap occurred, and cause the secure element to conclude that time constraints are not being violated as each swap is processed. In an attempt to cure this deficiency, another approach involves an internal time component that is established by monitoring clock ticks (e.g., of a clock accessible to the secure element), which can reduce the security risks associated with the software-based clock described above. However, this approach also has deficiencies, as the internal time component can be corrupted by tampering with the rate at which the clock ticks are produced by the clock. For example, a malicious party could potentially modify the operating frequency of the clock, modify the voltage being provided to the clock, etc., to cause clock ticks to be produced at a higher rate, thereby creating an illusion to the secure element that a longer amount of time has lapsed after the last swap occurred.

To cure the foregoing deficiencies, some embodiments involve including within the UE one or more sensors (e.g., temperature, voltage, etc.) configured to monitor the operating conditions of various modules included in the UE, e.g., the secure element, a security module with which the secure element is configured to interface, different clocks, and the like. According to some embodiments, the sensors can be calibrated in accordance with regular/expected operating parameters of the modules included in the UE, thereby enabling the identification of conditions where current operating parameters of the modules included in the UE are suspicious in nature (e.g., out of bound operating frequencies, temperatures, etc.). According to this approach, when the secure element receives a swap request, the secure element can first refer to the sensors to identify whether normal operating conditions are intact. More specifically, when the sensors indicate that normal operating conditions are intact, the secure element can conclude, at least to a reliable degree, that the information provided by the internal time component is accurate, and subsequently handle the swap request in accordance with swapping frequency constraints that are being enforced by the secure element. Alternatively, when the sensors indicate that normal operating conditions are not intact, the secure element can deny the swap request and transition into a protected mode, e.g., a temporary lockdown that prevents subsequent swap requests from being carried out until a period of time has lapsed. A more detailed explanation of these techniques is provided below in conjunction with FIGS. 5 and 7-8.

In another example, the rate limiting may be indirectly enforced. For example, in one variant, the secure element may require human interaction to execute the swap. Human interaction elements may include e.g., PINs, so-called Completely Automated Public Turing test to tell Computers and Humans Apart (CAPTCHA) type challenge-response tests (e.g., a distorted image that can be easily solved by a human, but are difficult for computers to process), physical switches and/or button presses, etc. Those of ordinary skill in the related arts will recognize that human interactions are significantly slower (several seconds) than software (several milliseconds), and thus have a reasonably low frequency, thereby effecting the desired rate limitations.

Moreover, it is further appreciated that human interaction elements can also serve to verify that the user of the mobile device is initiating the transfer (and not malicious software). In some embodiments, the mobile device can be manufactured with a physical presence pin (PPP) that is characterized in that it cannot be accessed or otherwise spoofed within software. Such a PPP can be connected to an external button (or switch, dial, etc.) that must be manipulated by a human during the swap (such as to initiate or confirm the swap) in order to complete the procedure.

Furthermore, those of ordinary skill in the related arts will readily recognize that certain ones of the aforementioned schemes may provide an additional benefit of verifying the legitimacy of the request. For example, a PIN code will verify that the requestor is a legitimate user. Similarly, biometric data (e.g., retinal scan image, fingerprint, voiceprint, facial recognition software image, etc.) may be used to verify the identity of the user. In some variants, the swap may be further limited based on information specific to one of the access control clients. For example, the user may be required to enter the PIN code of the active access control client (or alternately, the inactive access control client that is being swapped to replace the active access control client).

It is additionally recognized that for software initiated swaps, the requesting application may be required to provide some proof of legitimacy. Common examples include digital certificates, cryptographic challenges, etc.

While the foregoing schemes have been presented, those of ordinary skill in the related arts will readily recognize, given the contents of the present disclosure, that a wide multitude of rate limiting and/or verification schemes are possible in conjunction with the methods disclosed herein.

Referring now back to FIG. 1, when the determination of step 104 indicates that a swap can be performed, the secure element deactivates its currently active access control client (step 106); when a swap cannot be performed, the secure element ignores the request (step 108). At step 110, the secure element activates the previously inactive access control client.

Generally, the secure element deactivates/activates the access control clients via existing protocols and sequences. In some embodiments, these may be proprietary protocols specific to the access control client. In other embodiments, the protocols may be standardized for a wide array of different access control clients. Common examples of such a standardized protocol include the ISO/IEC 7816-4, which specifies, e.g., access protocols, and security mechanisms for messaging for smart card communications.

In one embodiment, the secure element decrements one or more credits from the total number of available credits. In some embodiments, the number of credits decremented may be adjusted based on various network preferences. For example, the network operator may be concerned with a type of swapping behavior, or a type of access control client. By increasing the number of credits decremented during these swaps, the mobile device will not be able to perform as many swaps before requiring a refresh.

In one embodiment, the secure element logs the transaction within an internal logging database. The database may track information including, without limitation: time of transaction, elapsed usage, access control client, number of attempts (e.g., for failed attempts), etc. In one embodiment, the internal logging database is stored within the secure element. In other embodiments, the logging database may be stored in the mobile device. In some variants, the logging database may be further secured via, e.g., encryption.

At step 112, the secure element synchronizes its transactions with a supervisory network entity (also referred to herein as the "network entity," "network security entity," "network server entity," and "supervisory network element") after network connectivity has been restored. In some embodiments, the synchronization is triggered during reconnection. In other embodiments, synchronization may be based on the amount of credits left. For example, where the secure element has an ample supply of credits, it may postpone synchronization. In still other embodiments, synchronization may be initiated on an as-needed basis, or alternately when directed by the user or an application.

During synchronization, the secure element transfers the logged transaction history to the network. The network can use the logged transaction history to, e.g., detect malicious activity, determine access control client usage, adjust billing, etc. In some embodiments, the secure element can replenish its balance of credits upon successfully completing synchronization. In other embodiments, the network determines the amount of credits the secure element should replenish. For example, where the network has identified malicious high frequency swapping, the network may not allow the secure element to replenish any credits.

Example Operation

Various exemplary implementations of the embodiment of the method presented in FIG. 1 are now discussed.

First, consider a cellular user equipment (UE) device that includes a secure electronic Universal Integrated Circuit Card (eUICC) having multiple electronic Subscriber Identity Modules (eSIMs). The eSIMs may be associated with one or more cellular networks having an associated cellular network technology. For example, in one exemplary scenario, the UE has eSIMs for: Carrier A operating a UMTS network (voice and data), Carrier B operating a Code Division Multiple Access (CDMA) 2000 (voice and data), and Carrier C operating an LTE network (data only).

Credit System

Figure 2:
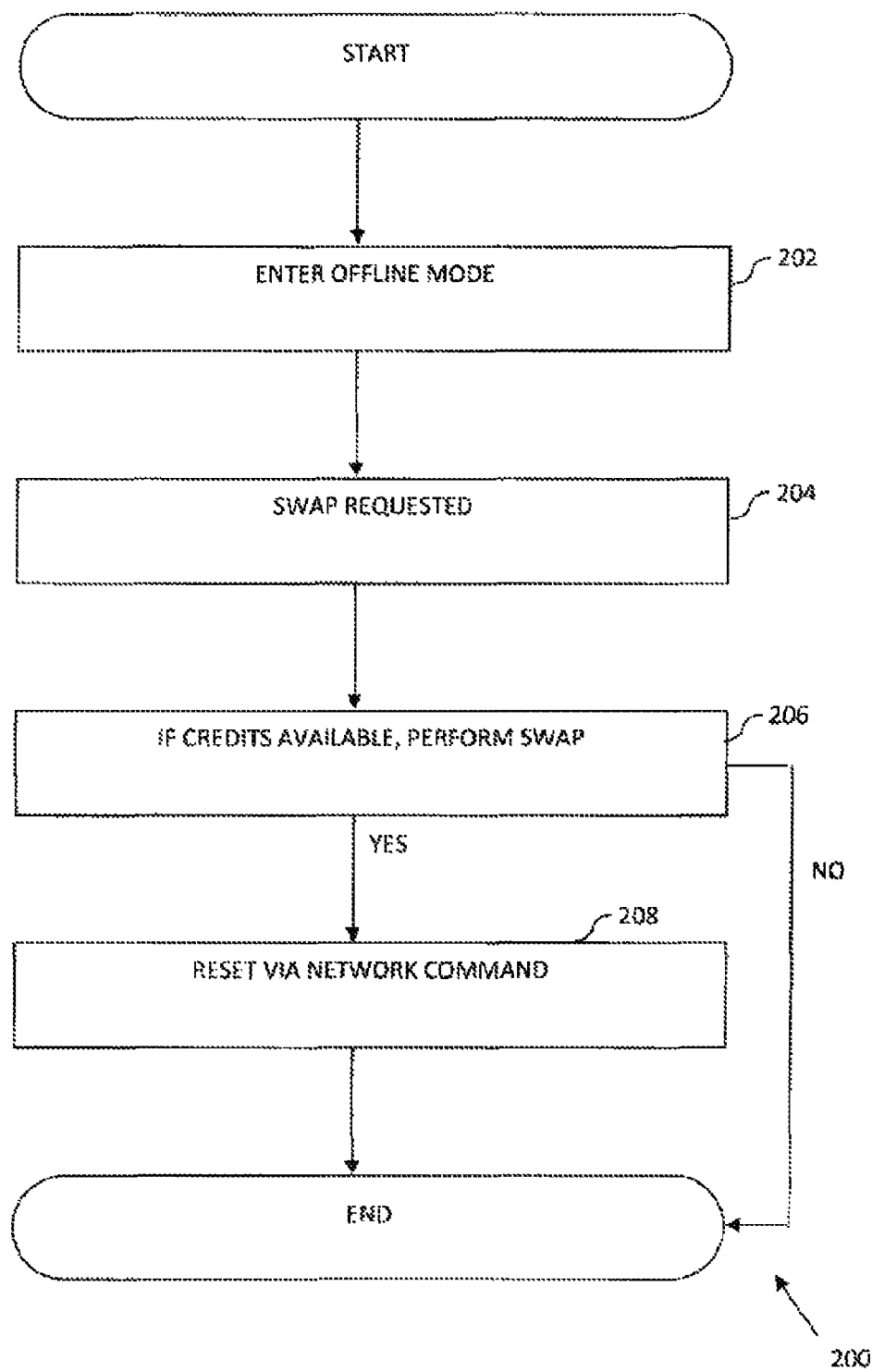
FIG. 2 is a logical flow diagram of one exemplary embodiment of a credit based system for controlling eSIM switching without requiring network access.

FIG. 2 illustrates one exemplary credit based system 200 for controlling eSIM switching without requiring network access.

Within the system of FIG. 2, the eUICC allows a preset maximum number of unauthorized (local) swap commands in 'offline' mode, where the eUICC has a number of credits equal to the preset maximum number.

At step 202, the mobile device enters an 'offline' mode during which the mobile device does not have network connectivity. In one exemplary scenario, the mobile device moves into an area with no network connectivity (e.g., an airplane). In other scenarios, the mobile device may disable operation, e.g., to reduce power consumption.

At step 204, an offline swap is requested. For example, a user may intentionally select a new eSIM while on an airplane, based on the flight destination.

At step 206, if credits are available, then a credit is decremented and the swap is performed. However, if there are no credits available (or insufficient credits), further offline swap requests are rejected.

Once the mobile device returns to online operation (i.e., where the mobile device has resumed network connectivity), the credit balance is increased or reset via an authorized command from an authorizing network server entity (step 208). The network server entity can monitor the requests to identify possibly suspicious behavior.

In one embodiment, the eUICC always attempts to 'top off' its credits whenever it resumes network connectivity. In this manner, the network server entity will be notified almost immediately of suspicious swapping behavior. If the network server entity detects any suspicious/fraudulent activity, the network server entity can, e.g., limit the number of credits issued, not issue credits, or in some cases flag the device for possible corrective actions.

In some variants, the eUICC further splits the swap into 'deselect' and 'select' operations. Specifically, the eUICC may freely allow offline deselect commands without authorization but require 'select' commands to be based on credits. In one such variant, there may be a default selectable profile that is useful for provisioning and or limited contact with the network server entity, but not e.g., user data access, voice calls, etc. During operation the default provisioning profile enables operation of the mobile device to load in other functional eSIMs, receive updates pushed from the network, etc.

Rate Limited System

Figure 3:
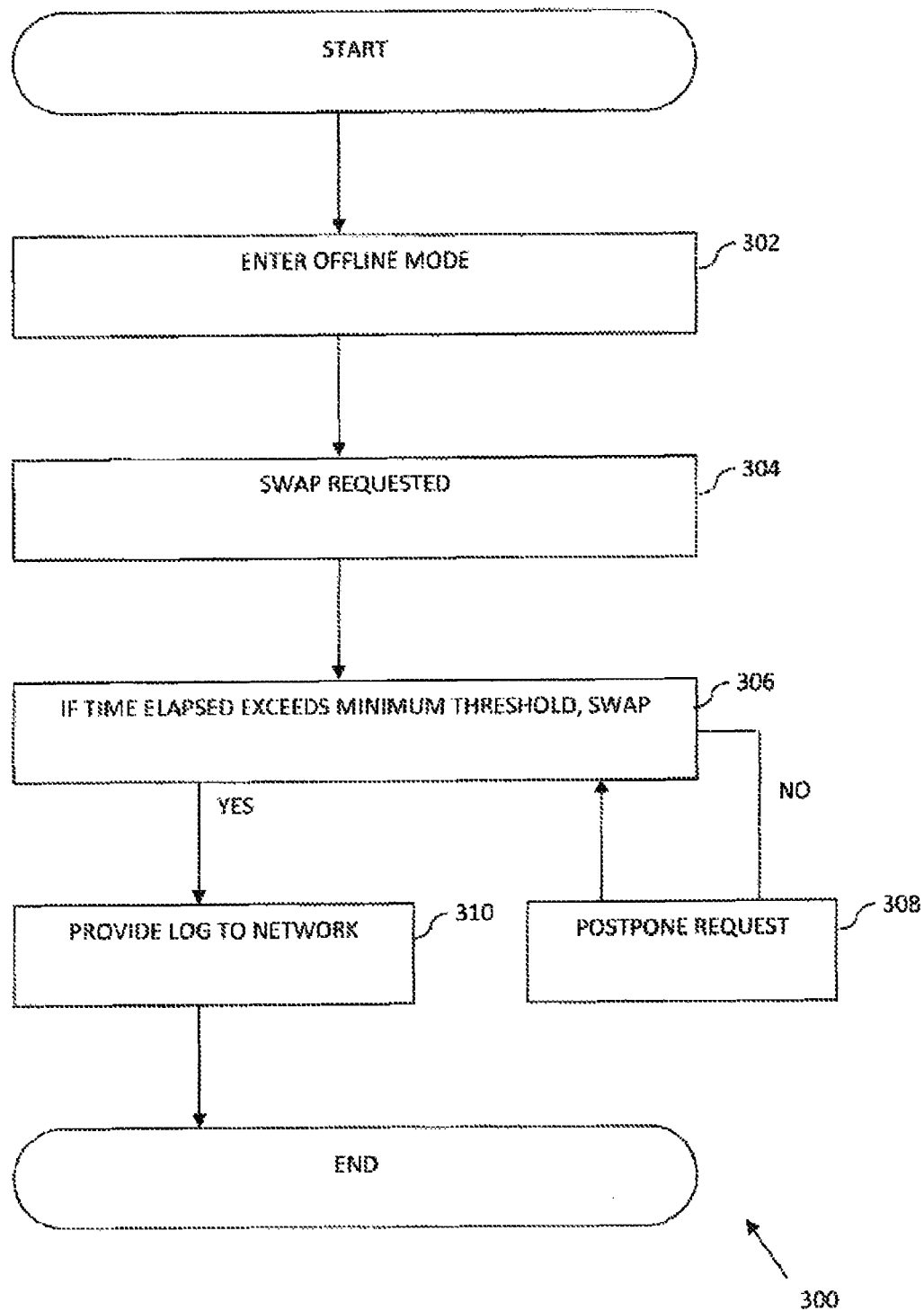
FIG. 3 is a logical flow diagram of one exemplary embodiment of a rate limited system for controlling eSIM switching without requiring network access.

FIG. 3 illustrates one exemplary rate limited system 300 for controlling eSIM switching without requiring network access.

In one exemplary embodiment, the eUICC has access to a time base that can be measured. While existing eUICCs do not have an internal clock (crystal oscillator, etc.), the secure element does receive a clock signal from the mobile device. This clock signal is not necessarily accurate (it can be intermittent), but it does provide sufficient timing to support an incrementing count that can be used to ensure that swap commands are not issued too frequently.

At step 302, the mobile device enters an 'offline' mode during which the mobile device does not have network connectivity, and, at step 304, an offline swap is requested.

At step 306, the eUICC estimates an amount of time that has elapsed after the last swap occurred. In one embodiment, the eUICC maintains an incrementing count of clock ticks that took place after the last swap event. When the clock ticks exceed a minimum threshold, the eUICC can perform a swap. Otherwise, the swap is ignored or alternately postponed (step 308).

Once the mobile device returns to online operation, the eUICC may provide its log information to the network server entity (optional step 310).

Human Interaction System

Figure 4A:
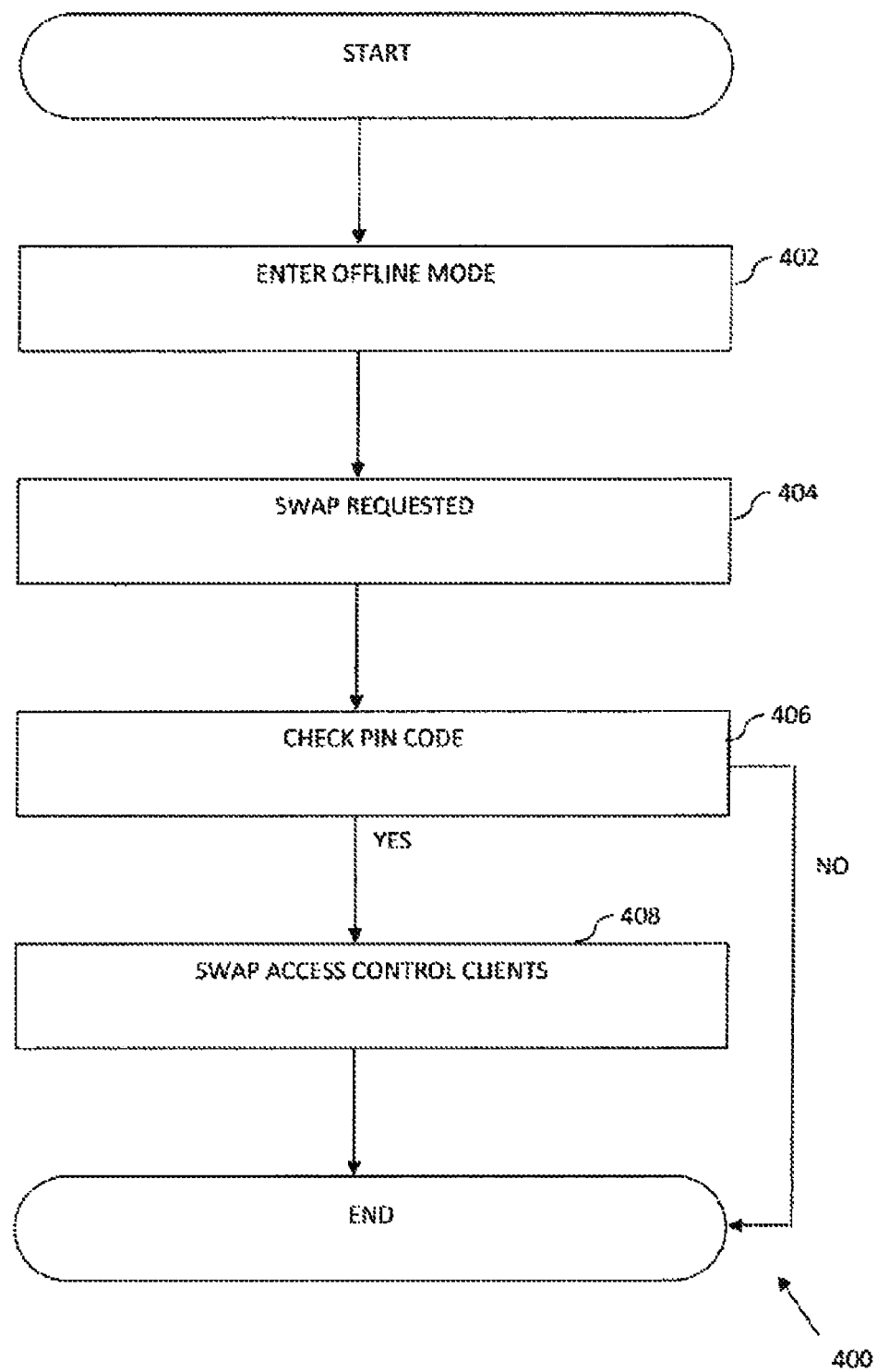
FIG. 4A is a logical flow diagram of one exemplary embodiment of a human interaction system for controlling eSIM switching without requiring network access, where the mobile device is not trusted.

In other embodiments, the eUICC attempts to verify that the offline swap was requested by a human (presumably the user of the mobile device). FIG. 4A illustrates one exemplary human interaction system 400 for controlling eSIM switching without requiring network access, where the mobile device is not trusted (i.e., where the only known secure element is the eUICC itself).

At step 402, the mobile device enters an 'offline' mode during which the mobile device does not have network connectivity, and, at step 404, an offline swap is requested.

At step 406, the eUICC verifies the presence of a human by, e.g., requesting a password or personal identification number (PIN) code that is uniquely associated with the eSIM that is being swapped. In some cases, the PIN code may be acquired by the user via an out-of-band mechanism (e.g., calling customer service); the additional security and time of PIN code entry ensures that the process is both rate limited and verifiable.

If the PIN code entry is correct, then the swap can proceed, otherwise the attempt is ignored (step 408).

In alternate implementations, the eUICC could produce a puzzle challenge easily solved by humans but not by computers such as a CAPTCHA. A correct answer to the puzzle within a time limit authorizes the command.

Figure 4B:
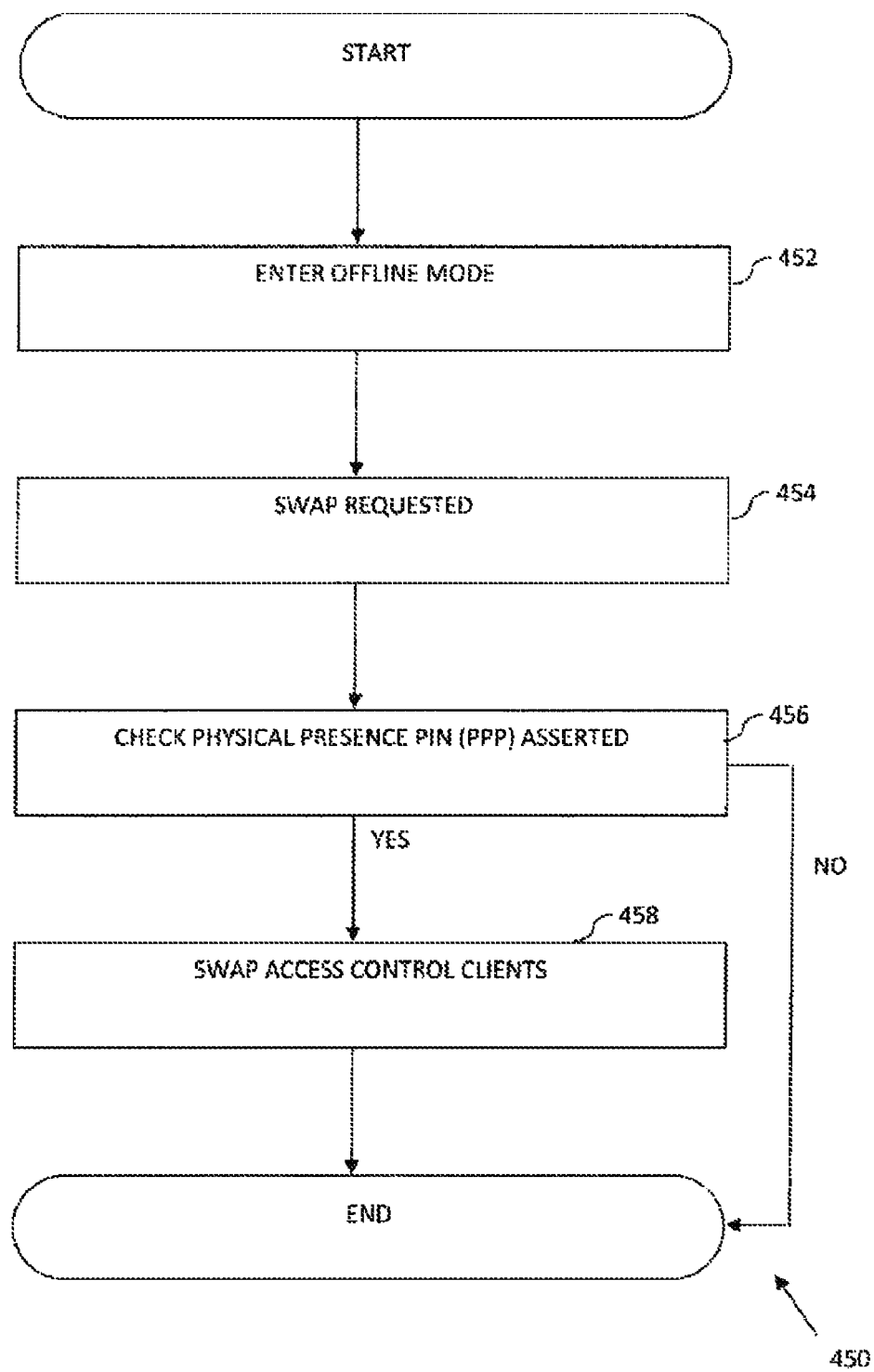
FIG. 4B is a logical flow diagram of one exemplary embodiment of a human interaction system for controlling eSIM switching without requiring network access, where at least portions of the mobile device are trusted.

Referring now to FIG. 4B one exemplary human interaction system 450 for controlling eSIM switching without requiring network access, where the mobile device is trusted is illustrated. In this embodiment, human interaction can be constructed with the aid of other components in a mobile device that are external to the eUICC. In such cases, the mobile device may be additionally configured in a manner that provides a physical presence pin (PPP) that cannot be manipulated by untrusted software.

At step 452, the mobile device enters an 'offline' mode during which the mobile device does not have network connectivity, and, at step 454, an offline swap is requested.

At step 456, the eUICC waits for the PPP to be asserted. In one such example, the PPP is exclusively routed between a hardware 'eject' switch on the mobile device and the eUICC.

In other embodiments, the PPP may be routed to another trusted/certified co-processor in the mobile device. During the verification process, the trusted processor may additionally implement secure input/output (I/O), biometric sensor data, or a CAPTCHA like mechanism to prove the human interaction, and then provide the appropriate signaling on the PPP.

Apparatus

Various apparatus useful in conjunction with the above described methods are now described in greater detail.

Figure 5:
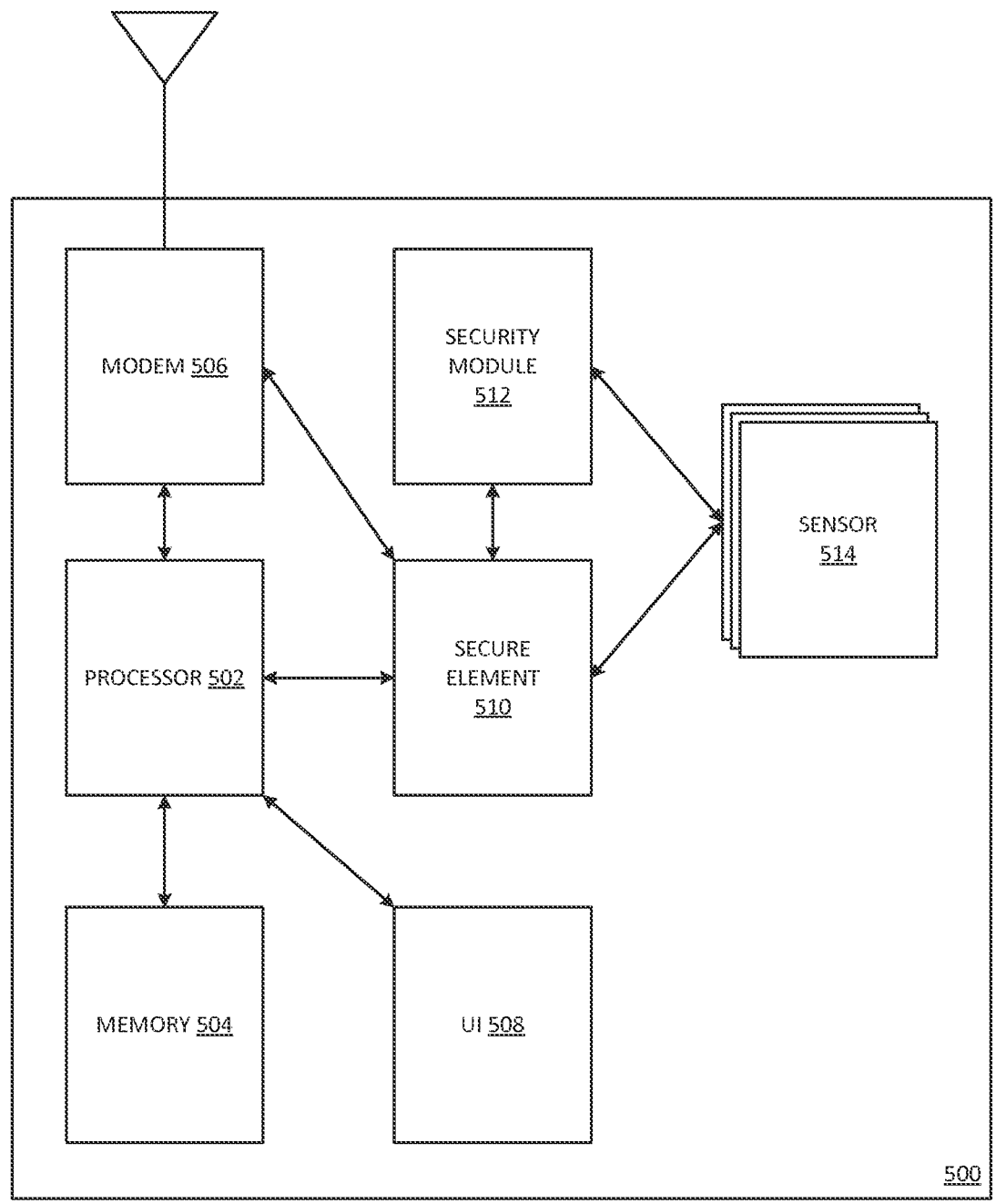
FIG. 5 is logical block diagram of an exemplary embodiment of a mobile device configured in accordance with various ones of the principles described herein.

Referring now to FIG. 5, an exemplary mobile device 500 (e.g., a user equipment (UE)) in accordance with various principles described herein is illustrated.

The exemplary UE apparatus of FIG. 5 is a wireless device with a processor subsystem 502 such as a digital signal processor, microprocessor, field-programmable gate array, or plurality of processing components mounted on one or more substrates. The processing subsystem may also include an internal cache memory. The processing subsystem is in communication with a memory subsystem 504 including memory that may, for example, include SRAM, flash, and/or Synchronous Dynamic Random Access Memory (SDRAM) components. The memory subsystem may implement one or a more of Direct Memory Access (DMA) type hardware, so as to facilitate data accesses as is well known in the art. The memory subsystem contains computer-executable instructions that are executable by the processor subsystem.

In one exemplary embodiment, the device can include of one or more wireless interfaces 506 adapted to connect to one or more wireless networks. The multiple wireless interfaces may support different radio technologies such as GSM, CDMA, UMTS, LTE/LTE-A, WiMAX, WLAN, Bluetooth, etc. by implementing the appropriate antenna and modem subsystems.

The user interface subsystem 508 includes any number of well-known I/O including, without limitation: a keypad, touch screen (e.g., multi-touch interface), a Liquid Crystal Display (LCD), backlight, speaker, and/or microphone. However, it is recognized that in certain applications, one or more of these components may be obviated. For example, PCMCIA card-type client embodiments may lack a user interface (as they could piggyback onto the user interface of the host device to which they are physically and/or electrically coupled).

In the illustrated embodiment, the device includes a secure element 510 that contains and operates the eUICC application. The eUICC is capable of storing and accessing a plurality of access control clients to be used for authentication with a network operator. The secure element includes in this embodiment a secure processor executing software stored in a secure media. The secure media is inaccessible to all other components (other than the secure processor). Moreover, the secure element may be further hardened to prevent tampering (e.g., encased in resin) as previously described.

The secure element 510 is capable of receiving and storing one or more access control clients. In one embodiment, the secure element stores an array or plurality of eSIMs associated with a user (e.g., one for work, one for personal, several for roaming access, etc.), and/or according to another logical scheme or relationship (e.g., one for each of multiple members of a family or business entity, one for each of personal and work use for the members of the family, and so forth). Each eSIM includes a small file system including computer readable instructions (the eSIM program), and associated data (e.g., cipher keys, integrity keys, etc.)

The secure element is further adapted to enable switching of eSIMs within the mobile device. Specifically, the secure element can be switch one or more eSIMs into "active" or "inactive" states.

In one exemplary embodiment, the secure element further includes an internal database configured to store an access control client transaction history. In one variant, the internal database tracks one or more of: time of transaction, elapsed usage, access control client, number of attempts (e.g., for failed attempts), etc.

In other embodiments, the secure element further includes access to a physical presence pin (PPP), where the PPP cannot be manipulated by untrusted software (i.e., requires physical manipulation, or is otherwise connected to a trusted software entity).

Furthermore, various realizations of the exemplary embodiment include instructions that, when executed, launch a challenge/response security protocol. The challenge response security protocol is configured to verify requests made by an unknown third party, based on appropriate generation of challenges and/or responses. Alternately, in one exemplary embodiment, the secure element can verify a digital certificate signed by a trusted authority.

As further illustrated in FIG. 5, the exemplary mobile device 500 can be configured to include a security module 512 that is supplemental to the secure element 510 and functions to promote a secure execution environment across the various components included in the exemplary mobile device 500. For example, secure element 510 can be configured to interface with the security module 512 prior to carrying out eSIM management operations (e.g., installing, uninstalling, activating, deactivating, swapping, etc.), where the security module 512 has the authority to approve or deny the eSIM management operations.

As further shown in FIG. 5, the exemplary mobile device 500 can be configured to include sensors 514, which can be configured to monitor, for example, various operating conditions of the processor 502, the secure element 510, the security module 512, and the like. The sensors 514 can include, for example, temperature sensors, voltage sensors, operating frequency sensors, etc., such that the sensors 514 can be utilized to identify suspicious operating conditions within the exemplary mobile device 500. For example, when the secure element 510 is configured to independently enforce eSIM management operation restrictions (without input from the security module 512)—which is described below in greater detail in conjunction with FIG. 7—the secure element 510 can be configured to reference the sensors 514 to properly identify conditions in which eSIM management operations should be denied. According some embodiments, referencing the sensors 514 can involve logging information produced by the sensors 514, where the information can include periodically-gathered data samples, triggers/alarms produced by the sensors 514 (e.g., in accordance with defined operating thresholds that correspond to hardware characteristics of components within the mobile device 500), and the like. Alternatively, when the security module 512 is configured to enforce eSIM management operation restrictions (in accordance with requests produced by the secure element 510)—which is described below in greater detail in conjunction with FIG. 8—the security module 512 can be configured to reference the sensors 514 to properly identify conditions in which eSIM management operations should be denied.

Figure 6:
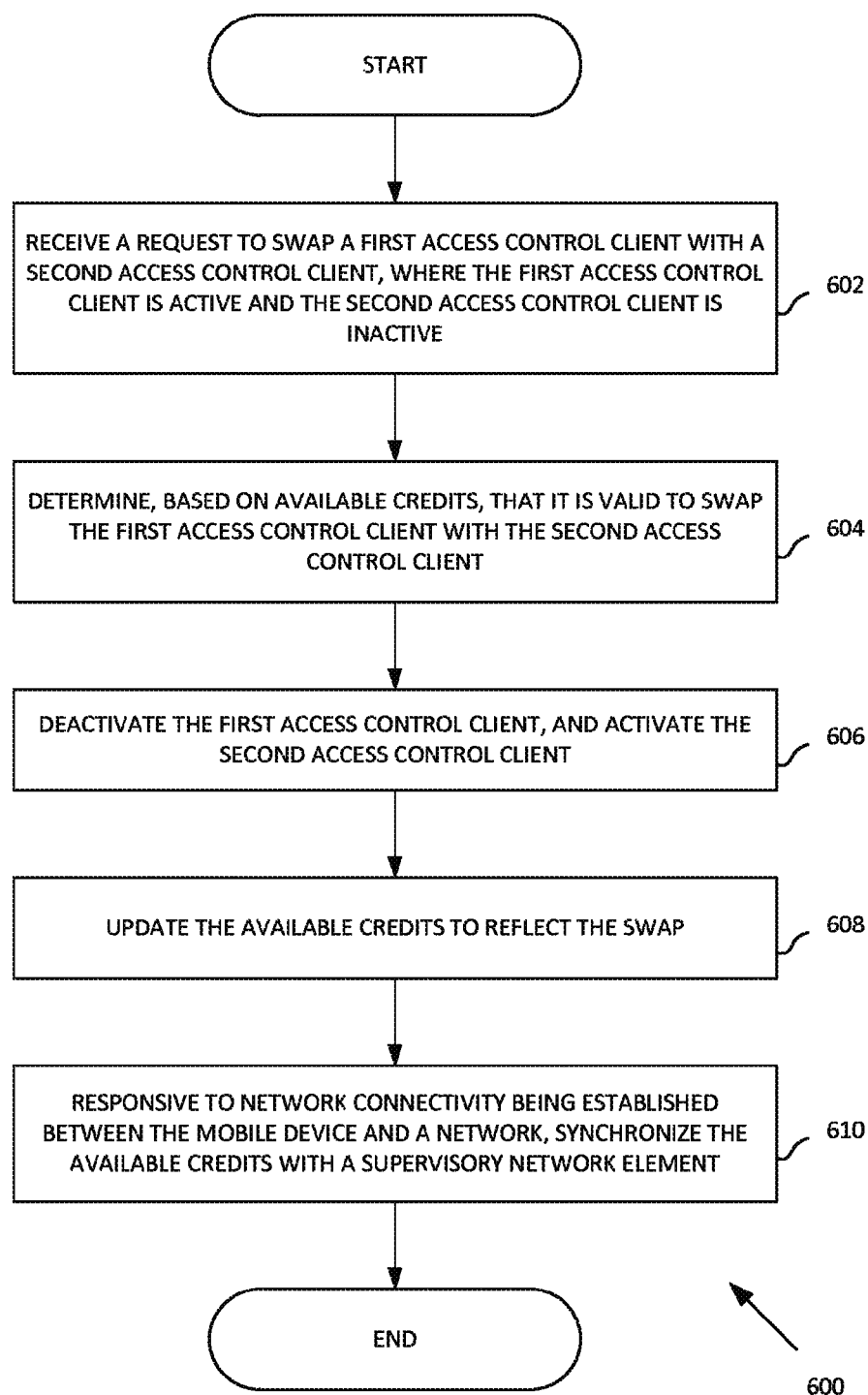
FIG. 6 is a logical flow diagram of one exemplary embodiment of a method for a credit based system for controlling eSIM switching and synchronizing with a network.

In addition, FIG. 6 is a logical flow diagram of one exemplary embodiment of a method 600 for a credit based system for controlling eSIM switching and synchronizing with a network. As shown in FIG. 6, the method 600 begins at step 602, where a mobile device receives a request to swap a first access control client with a second access control client, where the first access control client is active and the second access control client is inactive. At step 604, the mobile device determines, based on available credits, that it is valid to swap the first access control client with the second access control client. At step 606, the mobile device deactivates the first access control client, and activates the second access control client. At step 608, the mobile device updates the available credits to reflect the swap. Finally, at step 610, the mobile device, responsive to network connectivity being established between the mobile device and a network, synchronizes the available credits with a supervisory network element.

Figure 7:
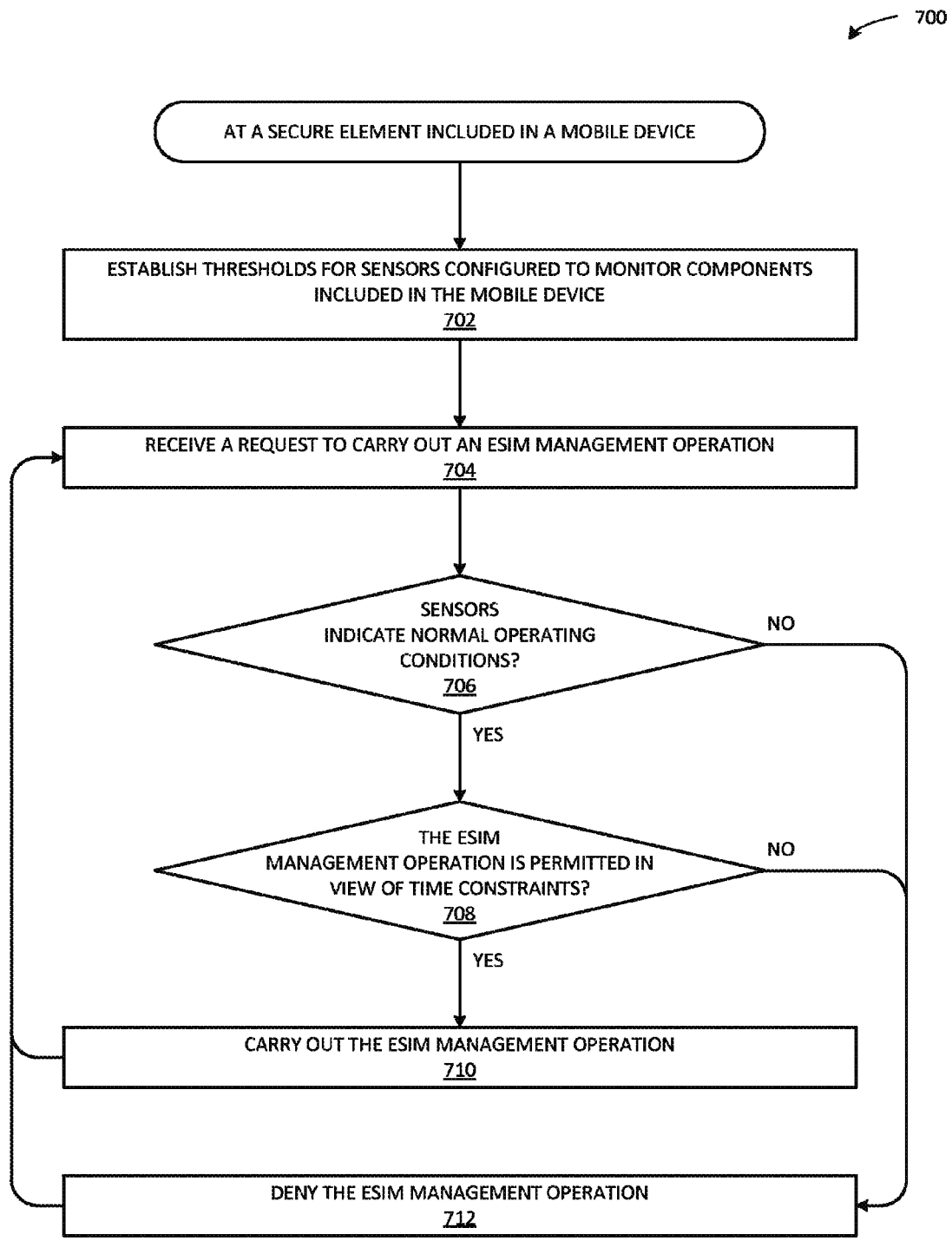
FIG. 7 is a logical flow diagram of one exemplary embodiment of a secure element (SE)-implemented method for controlling eSIM management operations.

FIG. 7 is a logical flow diagram of one exemplary embodiment of a secure element (SE)-implemented method 700 for controlling eSIM management operations. As shown in FIG. 7, the method 700 begins at step 702, where the secure element 510 establishes thresholds for sensors configured to monitor components included in a mobile device (e.g., the sensors 514 of FIG. 5). At step 704, the secure element 510 receives a request to carry out an eSIM management operation (e.g., installing, uninstalling, activating, deactivating, swapping, etc.). At step 706, the secure element 510 determines whether the sensors indicate normal operating conditions. If, at step 706, the secure element 510 determines that the sensors indicate normal operating conditions, then the method 700 proceeds to step 708. Otherwise, the method 700 proceeds to step 712, where the secure element 510 denies the eSIM management operation. At step 708, the secure element 510 determines whether the eSIM management operation is permitted in view of time constraints. If, at step 708, the secure element 510 determines that the eSIM management operation is permitted in view of time constraints, then the method 700 proceeds to step 710, where the secure element 510 carries out the eSIM management operation. Otherwise, the method 700 proceeds to step 712, where the secure element 510 denies the eSIM management operation.

Figure 8:
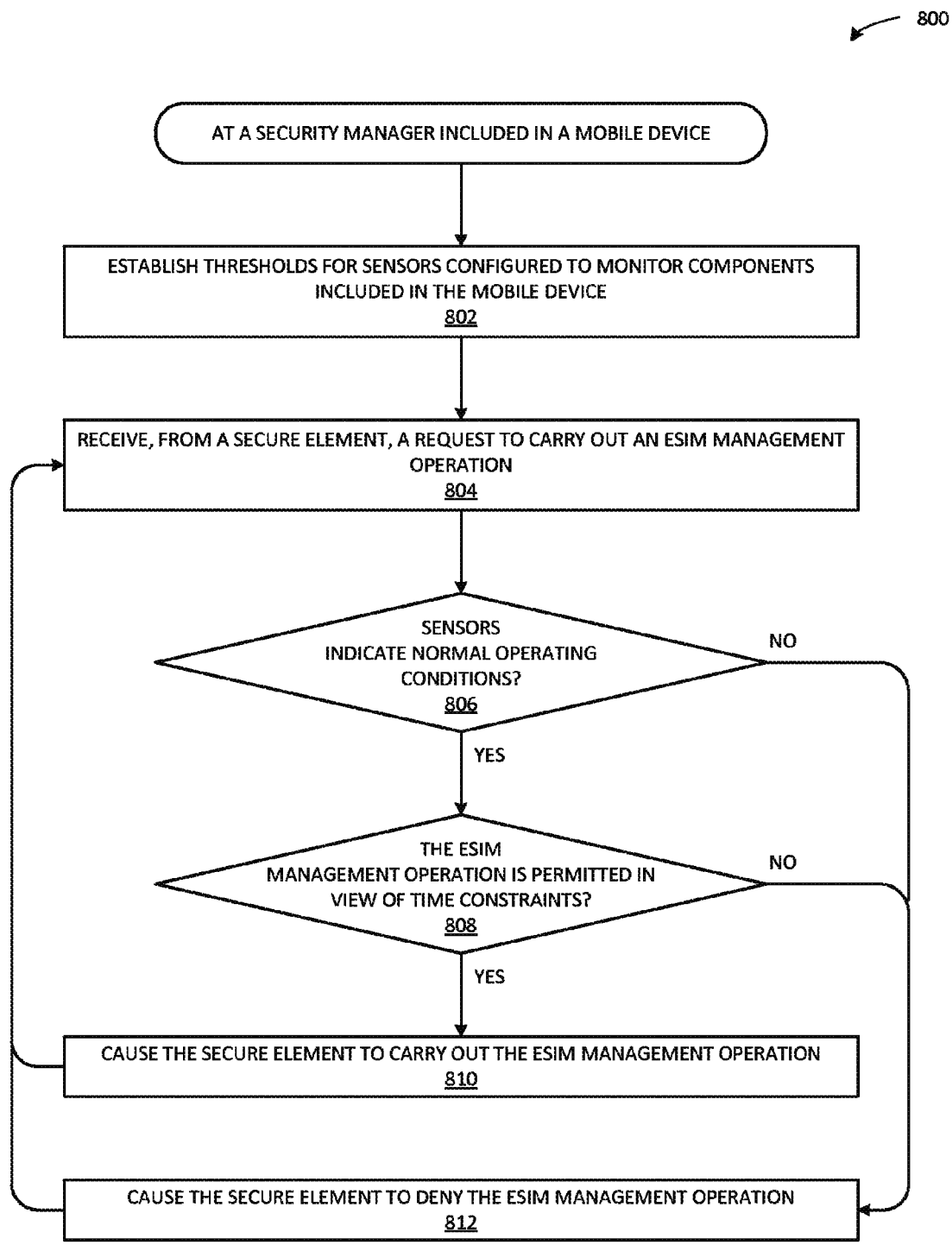
FIG. 8 is a logical flow diagram of one exemplary embodiment of a security module (SM)-implemented method for controlling eSIM management operations.

FIG. 8 is a logical flow diagram of one exemplary embodiment of a security module (SM)-implemented method 800 for controlling eSIM management operations. As shown in FIG. 8, the method 800 begins at step 802, where the security manager 512 establishes thresholds for sensors configured to monitor components included in the mobile device (e.g., the sensors 514 of FIG. 5). At step 804, the security manager 512 receives, from the secure element 510, a request to carry out an eSIM management operation. At step 806, the security manager 512 determines whether the sensors indicate normal operating conditions. If, at step 806, the security manager 512 determines that the sensors indicate normal operating conditions, then the method 800 proceeds to step 808. Otherwise, the method 800 proceeds to step 812, where the security manager 512 causes the secure element to deny the eSIM management operation. At step 808, the security manager 512 determines whether the eSIM management operation is permitted in view of time constraints. If, at step 808, the security manager 512 determines that the eSIM management operation is permitted in view of time constraints, then the method 800 proceeds to step 810, where the security manager 512 causes the secure element to carry out the eSIM management operation. Otherwise, the method 800 proceeds to step 812, where the security manager 512 causes the secure element 510 to deny the eSIM management operation.

Additionally, it is noted that the foregoing techniques can involve analyzing the types/kinds of eSIMs to which the management operations are directed. For example, when an eSIM management operation (e.g., at steps 704 or 804 described above in conjunction with FIGS. 7 and 8, respectively) involves transitioning from a "standard" eSIM (e.g., one that enables a mobile device to access voice and data services) to an "emergency" eSIM (e.g., one that enables the mobile device to only access emergency phone numbers), the secure element 510/security manager 512 can be configured to automatically carry out the transition with little or no further consideration. In the same example, when a subsequent eSIM management operation involves transitioning from an emergency eSIM back to a standard eSIM, the secure element 510/security manager 512 can be configured to execute the steps of FIGS. 7 and 8, respectively, which can either result in causing the transition to occur or preventing the transition from occurring. Further embodiments can involve analyzing the types/kinds of eSIM management operations that are to be applied to eSIMs when carrying out the various rate limiting techniques set forth herein. For example, the various components described herein can be configured to enable an emergency eSIM to be activated without limitation, and further can be configured to apply rate limiting functionalities when requests are received to apply update-related eSIM management operations to the emergency eSIM.

It will be recognized that while certain features are described in terms of a specific sequence of steps of a method, these descriptions are only illustrative of the broader methods disclosed herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art. The foregoing description is of the best mode presently contemplated. This description is in no way meant to be limiting, but rather should be taken as illustrative of the general principles described herein.

What is claimed is:

1. A method for providing controlled switching of access control clients within a mobile device without requiring access to a network, the method comprising:
   at a security module included in the mobile device, wherein the security module is separate and distinct from a secure element included in the mobile device:
   receiving, from the secure element, a request to swap a first access control client with a second access control client, wherein the first access control client is active and the second access control client is inactive;

obtaining content from at least one sensor included in the mobile device;

referencing the content against at least one pre-defined threshold to determine whether at least one module is operating within pre-defined thresholds; and when the at least one module is operating within the pre-defined thresholds:

determining, based on an internal time component that corresponds to the at least one module, whether the request is valid, and when the request is valid:

causing the secure element to deactivate the first access control client, and causing the secure element to activate the second access control client.

2. The method of claim 1, wherein the at least one module is selected from:

the security module and the secure element.

3. The method of claim 1, wherein the internal time component counts a number of clock ticks that have occurred after a receipt of a previous request to swap access control clients.

4. The method of claim 1, wherein the at least one sensor is selected from:

one or more temperature sensors, one or more voltage sensors, and one or more operating frequency sensors.

5. The method of claim 1, wherein the request is generated based on one or more of:

a geographic location of the mobile device and a usage level of the mobile device.

6. The method of claim 1, wherein the internal time component is maintained by sampling clock ticks produced by a clock that corresponds to the at least one module.

7. The method of claim 1, further comprising, prior to receiving the request:

establishing the pre-defined thresholds in accordance with hardware characteristics of the at least one module.

8. The method of claim 1, further comprising, when the at least one module is not operating within the pre-defined thresholds, or when the request is not valid:

causing the secure element to ignore the request.

9. A non-transitory computer readable storage medium configured to store instructions that, when executed by a security module included in a mobile device, cause the mobile device to provide controlled switching of access control clients without requiring access to a network, by carrying out steps that include:

receiving, from a secure element that is included in the mobile device and is distinct from the security module, a request to swap a first access control client with a second access control client, wherein the first access control client is active and the second access control client is inactive;

obtaining content from at least one sensor included in the mobile device;

referencing the content against at least one pre-defined threshold to determine whether at least one module is operating within pre-defined thresholds; and when the at least one module is operating within the pre-defined thresholds:

determining, based on an internal time component that corresponds to the at least one module, whether the request is valid, and when the request is valid:

causing the secure element to deactivate the first access control client, and causing the secure element to activate the second access control client.

10. The non-transitory computer readable storage medium of claim 9, wherein the internal time component counts a number of clock ticks that have occurred after a receipt of a previous request to swap access control clients.

11. The non-transitory computer readable storage medium of claim 9, wherein the at least one sensor is selected from:

one or more temperature sensors, one or more voltage sensors, and one or more operating frequency sensors that monitor the operation of the secure element.

12. The non-transitory computer readable storage medium of claim 9, wherein the request is generated based on one or more of: a geographic location of the mobile device and a usage level of the mobile device.

13. The non-transitory computer readable storage medium of claim 9, wherein the internal time component is maintained by sampling clock ticks produced by a clock that corresponds to the secure element.

14. The non-transitory computer readable storage medium of claim 9, wherein the steps further include, prior to receiving the request:

establishing the pre-defined thresholds in accordance with hardware characteristics of the secure element.

15. The non-transitory computer readable storage medium of claim 9, wherein the steps further include, subsequent to deactivating the first access control client and activating the second access control client:

receiving a second request to swap the second access control client with a third access control client, wherein the second access control client enables the mobile device to consume voice services and data services, and the third access control client enables the mobile device only to consume emergency services, and in response to the second request:

deactivating the second access control client, and activating the third access control client.

16. A mobile device configured to control switching of access control clients without requiring access to a network, the mobile device comprising:

a secure element configured to manage at least a first access control client and a second access control client; and a security module that is separate and distinct from the secure element, wherein the security module is configured to carry out steps that include:

receiving, from the secure element, a request to swap the first access control client with the second access control client, wherein the first access control client is active and the second access control client is inactive;

obtaining content from at least one sensor included in the mobile device;

referencing the content against at least one pre-defined threshold to determine whether at least one module is operating within pre-defined thresholds; and when the at least one module is operating within the pre-defined thresholds:

determining, based on an internal time component that corresponds to the at least one module, whether the request is valid, and when the request is valid:

causing the secure element to deactivate the first access control client, and causing the secure element to activate the second access control client.

17. The mobile device of claim 16, wherein the at least one module is selected from: the security module and the secure element.

18. The mobile device of claim 16, wherein the internal time component counts a number of clock ticks that have occurred after a receipt of a previous request to swap access control clients.

19. The mobile device of claim 16, wherein the internal time component is maintained by sampling clock ticks produced by a clock that corresponds to the at least one module.

20. The mobile device of claim 16, wherein, when the at least one module is not operating within the pre-defined thresholds, or when the request is not valid, the steps further include:

causing the secure element to ignore the request.

* * * * *